United States Patent [19]

Kusaka et al.

[11] Patent Number: 5,398,411
[45] Date of Patent: Mar. 21, 1995

[54] PROCESS FOR PRODUCING SUSPENSION MEMBER FOR VEHICLE

[75] Inventors: Kaoru Kusaka; Yasunori Oku; Yasushi Nakazawa, all of Wako, Japan

[73] Assignee: Honda Giken Kogyo Kabushiki Kaisha, Tokyo, Japan

[21] Appl. No.: 284,998

[22] Filed: Aug. 3, 1994

Related U.S. Application Data

[63] Continuation of Ser. No. 986,536, Dec. 7, 1992, abandoned.

[30] Foreign Application Priority Data

Dec. 10, 1991 [JP] Japan ................. 3-326191

[51] Int. Cl.6 ............................................. B23P 17/00
[52] U.S. Cl. ................................ 29/897.2; 29/417; 29/527.6; 72/255; 280/661
[58] Field of Search .............. 29/417, 527.6, 897.2; 72/254, 255, 256, 260; 280/96.1, 660, 661

[56] References Cited

U.S. PATENT DOCUMENTS

| | | | |
|---|---|---|---|
| 3,321,950 | 5/1967 | Gettig | 72/255 |
| 4,463,057 | 7/1984 | Knürr | 72/254 X |
| 4,939,828 | 7/1990 | Maier | 29/897.2 |

FOREIGN PATENT DOCUMENTS

| | | | |
|---|---|---|---|
| 2-169312 | 6/1990 | Japan | 72/254 |
| 4-59147 | 2/1992 | Japan | 72/254 |

*Primary Examiner*—Tom Hughes
*Attorney, Agent, or Firm*—Armstrong, Westerman, Hattori, McLeland & Naughton

[57] ABSTRACT

A process for producing a suspension member for a vehicle, which member comprises a first mounting portion relatively swingably connected to either one of a vehicle body and an axle, through a connecting member, an a second mounting portion integrally connected to the first mounting portion and connected to the other of the vehicle body and the axle. The first mounting portion is provided at an outer surface thereof with a pair of parallel cam guides of readjusting the relative mounting position between the first mounting portion and a connection member by cooperation with eccentric cams connected to the connecting member. The process comprises steps of forming a base material for the suspension member by an extrusion, and cutting the base material along planes spaced at an equal distance form onto another in an extruding direction to provide a plurality of the suspension members. The extruding direction is set along the cam guides such that the cam guides of each of the suspension members are formed by the extrusion. Thus, the cam guides for adjusting the alignment can be easily formed at given locations on the suspension member with good accuracy.

2 Claims, 8 Drawing Sheets

PROCESS FOR PRODUCING SUSPENSION MEMBER FOR VEHICLE

This application is a continuation of application Ser. No. 07/986,536, filed Dec. 7, 1992, now abandoned.

BACKGROUND OF THE INVENTION

1. Field of the Invention

The present invention relates to a process for producing a suspension member, such as a suspension arm, a suspension bracket, and the like, and particularly, to a suspension member for a vehicle, comprising a first mounting portion for relatively swingably connected to either one of a vehicle body and an axle through a connecting member, and a second mounting portion integrally connected to the first mounting portion and connected to the other of the vehicle body and the axle, the first mounting portion, provided at an outer surface thereof with a pair of parallel cam guides for adjusting the relative mounting position between the first mounting portion and a connection member by cooperation with eccentric cams connected to the connecting member.

2. Description of the Prior Art

There are conventionally known suspension members, as shown in FIGS. 9 and 10. A cam guide (G', FIG. 9, G", FIG. 10) is integrally projected from conventional suspension member A'. The relative mounting position between the connecting member and the suspension member A', i.e., the geometric point, can be adjusted by use of the cam guide (G', G") and an eccentric cam $C_1$ on the connecting member in combination, thereby adjusting the alignment of camber, or the like.

In the case of the above prior art as shown in FIG. 9, the suspension member A', after being formed, is subjected to a special cutting to form the cam guides G'. Or as shown in FIG. 10, the separate member G" is post-attached to the suspension member A' by securing means, such as, by welding w, to form the cam guide G".

However, the former method is accompanied by a problem that a certain dimensional tolerance may be produced in the positioning of a guide surface of the cam guide G' with respect to the suspension member A' due to a positioning error of a jig or a cutting machine in conducting the above-described cutting. The latter method is also accompanied by a problem that a certain dimensional tolerance may be likewise produced in the positioning of a guide surface of the separate member G" for the cam guide with respect to the suspension member A' in conducting the welding. Further, it is necessary to provide a welding margin in the separate member G" for the cam guide and for this reason, the shape of the separate member G" may be limited in many cases, and the separate member G" tends to be increased in size and in weight.

In the prior art method, the cam guide is formed, or secured, at a separate step after formation of a suspension member body, as described above. This results in a limitation in accurately placing the cam guide to each mating portion of the suspension member body. In a mechanism of adjusting the alignment by the eccentric cams and cam guides, if the total of the dimensional tolerances of the cams and cam guides is represented by $\pm d$, this directly effects the dimensional tolerance $\pm D$ of a body mounting portion or a knuckle mounting portion and as a result, the dimensional tolerance of the entire system is $\pm(D+d)$. Therefore, the alignment adjusting range must be correspondingly widened, which is contrary to an essential primary purpose of the adjusting mechanism to adjust the D. Thus, it is necessary to reduce the dimensional tolerance d to the utmost.

SUMMARY OF THE INVENTION

Accordingly, it is an object of the present invention to provide a process for producing a suspension member for a vehicle, wherein the problems associated with the prior art are overcome, and the cam guide can easily be positioned at a given location on the suspension member.

To achieve the above object, according to the present invention, there is provided a process for producing a suspension member for a vehicle, comprising a first mounting portion, capable of being relatively swingably connected to either one of a vehicle body and an axle through a connecting member, and a second mounting portion, integrally connected to the first mounting portion, and connected to the other of the vehicle body and the axle. The first mounting portion, provided at an outer surface thereof with a pair of parallel cam guides, for adjusting the relative mounting position between the first mounting portion and a connection member by cooperation with eccentric cams connected to the connecting member. The process comprising steps of forming a base material for the suspension member, by an extrusion, and cutting the base material along planes spaced at an equal distance from one another in an extruding direction to provide a plurality suspension members, the extruding direction being set along the cam guides, such that, the cam guides of each of the suspension members are formed by the extrusion.

With the above feature of the present invention, the cam guides can be formed at given locations with a good accuracy simultaneously with the extrusion for the suspension member. This ensures that the adjustment of alignment can be carried out properly and accurately by the cooperation of the cams and the cam guides, and also contributes to an increase in range of the adjustment. Moreover, it is possible to omit the cutting step and the welding step for provision of the cam guides, which have been required in the prior art after the formation of the suspension member. Therefore, the operating steps can be correspondingly simplified, leading to reduction in cost. Further, it is unnecessary to specially provide the welding margin in the cam guides, as is the case where the cam guides are welded. This contributes to a corresponding reduction in size and weight of the suspension member.

The above and other objects, features and advantages of the invention will become apparent from the following description of the preferred embodiments, taken in conjunction with the accompanying drawings.

DESCRIPTION OF THE PREFERRED EMBODIMENTS

The structure of a suspension arm as a suspension member for an automobile produced by a method according to the present invention will now be described in connection with FIGS. 1 to 4.

The suspension arm A is a so-called I-shaped arm and comprises a first mounting portion $J_1$ and a second mounting portion $J_2$ which are pivotally connected to other members, not shown, connected to a vehicle body or an axle, respectively, and an arm body 1 for integrally coupling the first and second mounting portions $J_1$ and $J_2$ to each other. The arm body 1 is comprised of a framework formed by integral assembling of a pair of main ribs $R_1$ and $R_2$ extending in a direction connecting both the mounting portions $J_1$ and $J_2$, and a plurality of subsidiary ribs R connecting both the main ribs $R_1$ and $R_2$.

Each of the mounting portions $J_1$ and $J_2$ is connected to the other member by a bushing Bu which is formed on an outer collar $3o$ and an inner collar $3i$ coupled with each other through a cylindrical rubber 3R. Each of the mounting portions $J_1$ and $J_2$ is comprised of a pair of opposed sidewalls 2 each having a mounting hole $2a$ through which a connecting bolt Bo, for the bushing Bu, is passed. Opposed surfaces of the sidewalls 2 of each pair are flat abutment surfaces $2c$ with which opposite ends of the inner collar $3i$ of the bushing Bu mate, respectively. Each of the abutment surfaces $2c$ is provided at an outer end thereof with a arcuate shaped chamfer $2r$ for facilitating the assembling of the bushing Bu.

Figure 1:
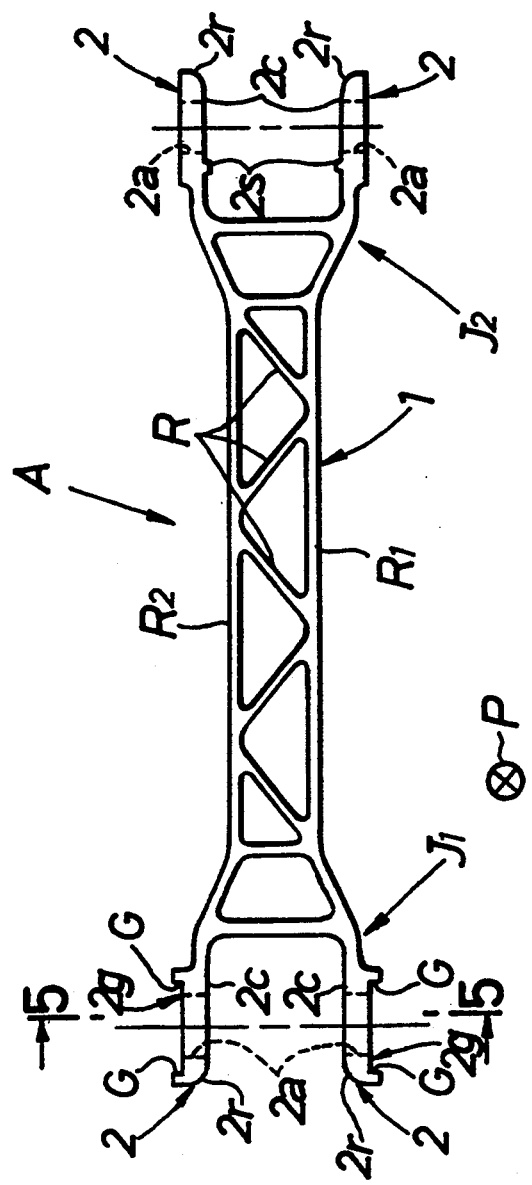
FIG. 1 is a plan view of a first embodiment of a suspension arm produced by a method according to the present invention.
Figure 2:
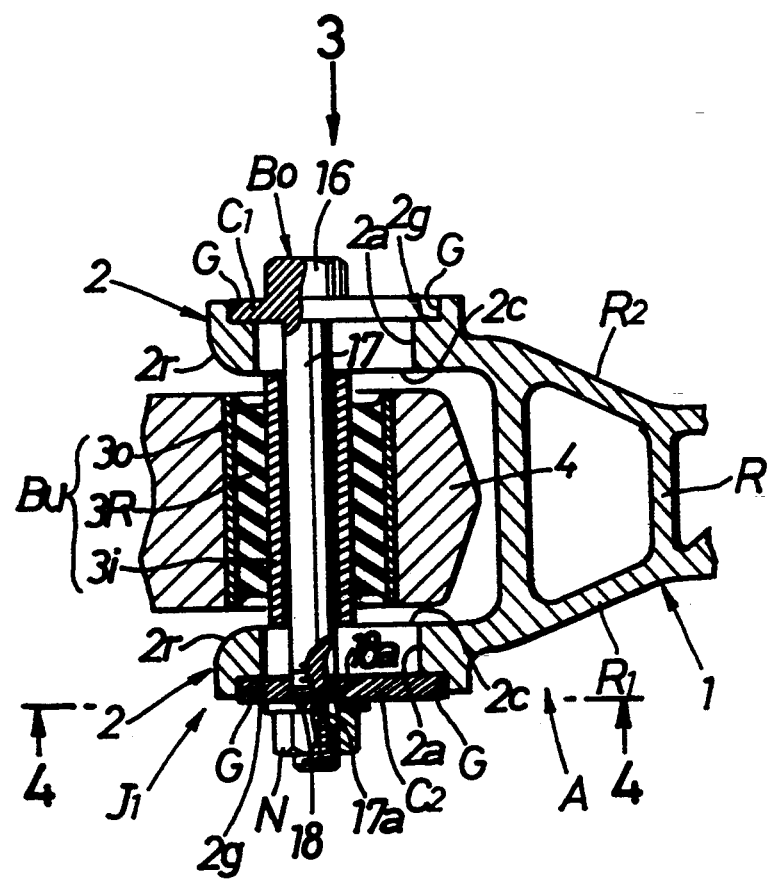
FIG. 2 is an enlarged plan view of an essential portion, illustrating the coupling state of the suspension arm to another member.

Particularly, each of the sidewalls 2 of the first mounting portion $J_1$ has a guide groove $2g$ provided in its outer surface to extend in a direction perpendicular to the paper sheets of FIGS. 1 and 2. Parallel inner opposed walls of the groove $2g$ are used as cam guides G. The mounting hole $2a$ in the first mounting portion $J_1$ is an elongated hole defined longer in a direction of an axis of the arm (in a lateral direction as viewed in FIG. 1). The bolt Bo is inserted through this mounting hole $2a$ such that a head 16 of the bolt Bo is engaged with an outer surface of one of the sidewalls 2. A nut N is threadedly fitted over a shank 17 of the bolt Bo to engage an outer surface of the other sidewall 2. Thus, the inner collar $3i$ of the bush Bu as a connecting member is clamped and fixed between the pair of sidewalls 2 by the bolt Bo and the nut N.

Figure 3:
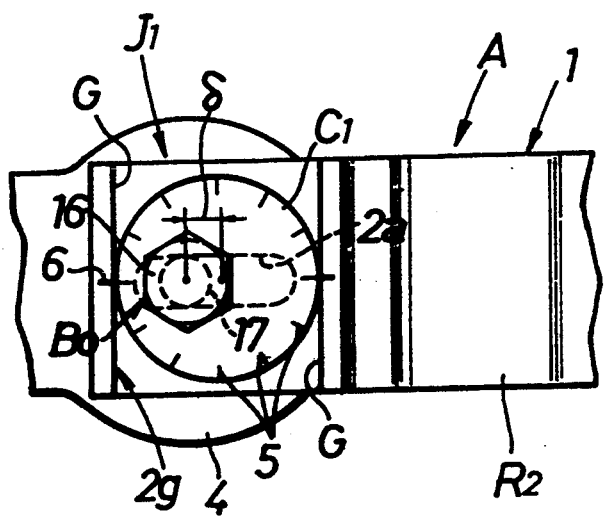
FIG. 3 is a side view taken along an arrow 3 in FIG. 2.
Figure 4:
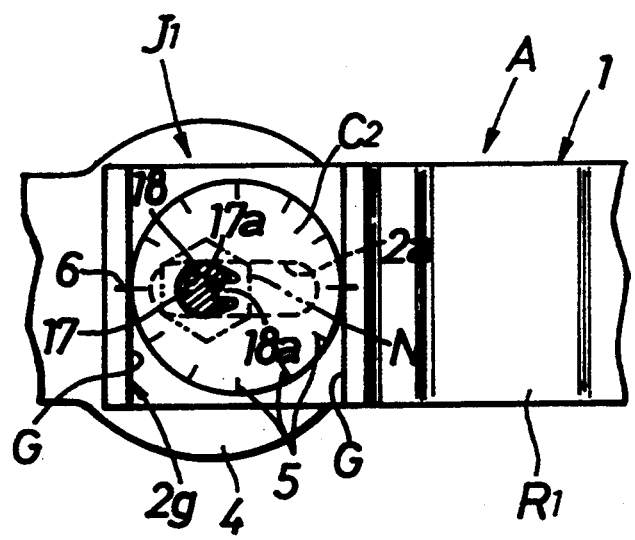
FIG. 4 is a sectional view taken along an arrow 4 in FIG. 2.

As shown in FIG. 3, a disk-like first eccentric cam $C_1$ is secured to an outer periphery of the head 16 of the bolt Bo, for example, by integral molding or welding, so that an outer periphery of the first eccentric cam $C_1$ offset with respect to an axis of the head 16 is brought into abutment with the cam guides G. A second eccentric cam $C_2$ is formed with the same peripheral shape and the same phase as the first eccentric cam $C_1$ and adjacent an inner side of the nut N through a washer and has a through hole 18 fitted over a tip portion of the shank 17 of the bolt Bo, as shown in FIG. 4. An engage projection $18a$ provided on an inner periphery of the through hole 18 and a key groove $17a$ provided in an outer periphery of the shank 17 are engaged with each other so as to inhibit a relative rotation of the bolt Bo and the second eccentric cam $C_2$. Thus, if the bolt Bo is turned relative to the arm A in a condition in which the nut N is loosened relative to the bolt Bo, the eccentric cams $C_1$ and $C_2$ can be turned about the axis of the bolt Bo in a manner to follow the bolt Bo. The shank 17 of the bolt Bo is caused to slide in a longitudinal direction of the mounting hold $2a$ in correspondence to the turning amount of bolt Bo. Therefore, it is possible to adjust the relative mounting position of the bush Bu with respect to the suspension arm A, i.e., a geometric point in a range of two times as much as the eccentricity $\delta$ of the eccentric cams $C_1$ and $C_2$. After the adjustment of the mounting position, the fixing of the bolt Bo is secured by tightening the nut N while retaining the bolt Bo at the adjusted turned position to a tool. Thus, the adjustment of alignment can be performed between the suspension arm A and a knuckle arm 4 (or a suspension bracket on the vehicle body) fixed to the outer periphery of the outer collar $3o$ of the bush Bu. It should be noted that in this adjustment, it is convenient to set one of gradations 5 calibrated on the outer periphery of each of the eccentric cams $C_1$ and $C_2$ at a mark 6 provided at a central portion of each of the cam guides G.

The mounting holes $2a$ in the second mounting portion $J_1$ is also an elongated hole similar to that in the first mounting portion $J_2$, or a circular hole. And a bush (not shown) for pivotally connecting the above-described other member to the suspension arm A is connected by the bolt inserted through this mounting hole $2a$ and a usual nut. A stopper $2s$ is integrally provided on each of the opposed surfaces of the sidewalls 2 of the second mounting portion $J_2$ and utilized for positioning the suspension arm A in the assembling process. These stoppers $2s$ also extend in a direction perpendicular to the paper sheet of FIG. 1.

Figure 5:
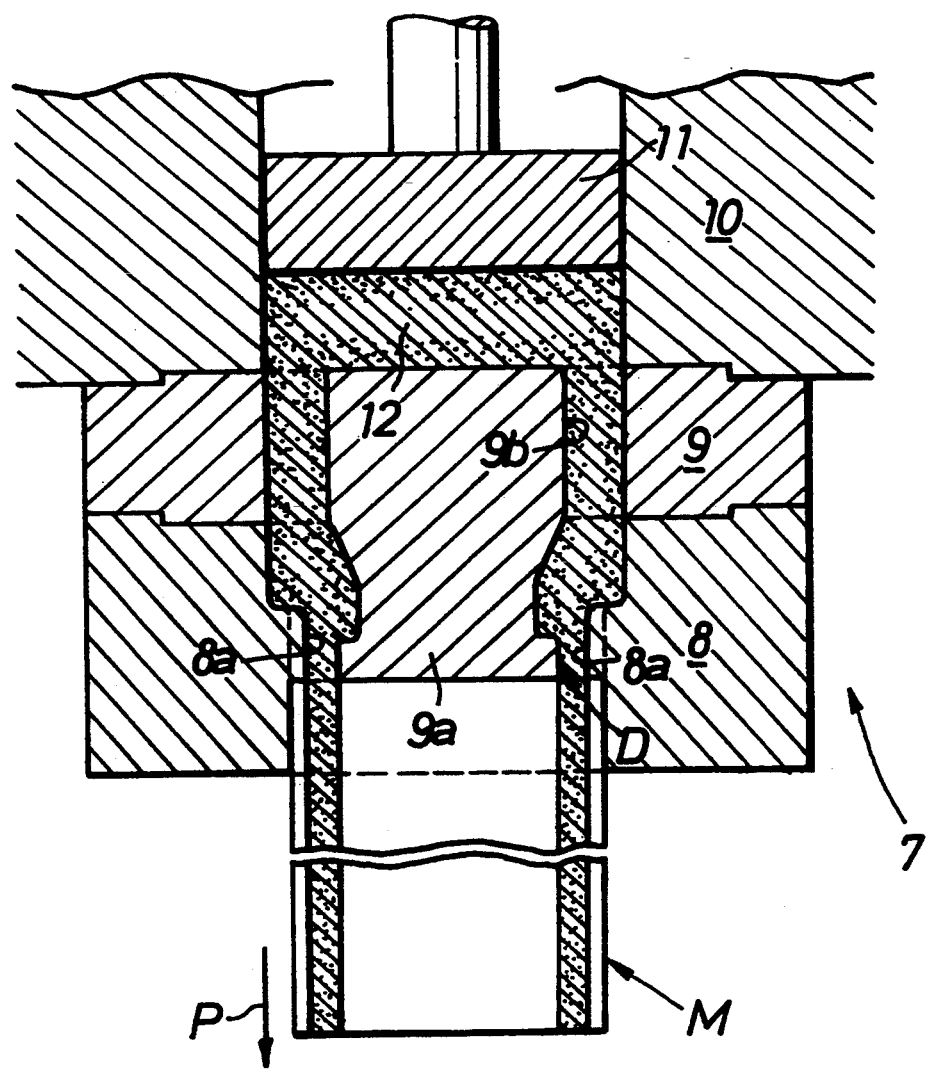
FIG. 5 is a sectional view of an extruding apparatus for explaining an extruding step.
Figure 6:
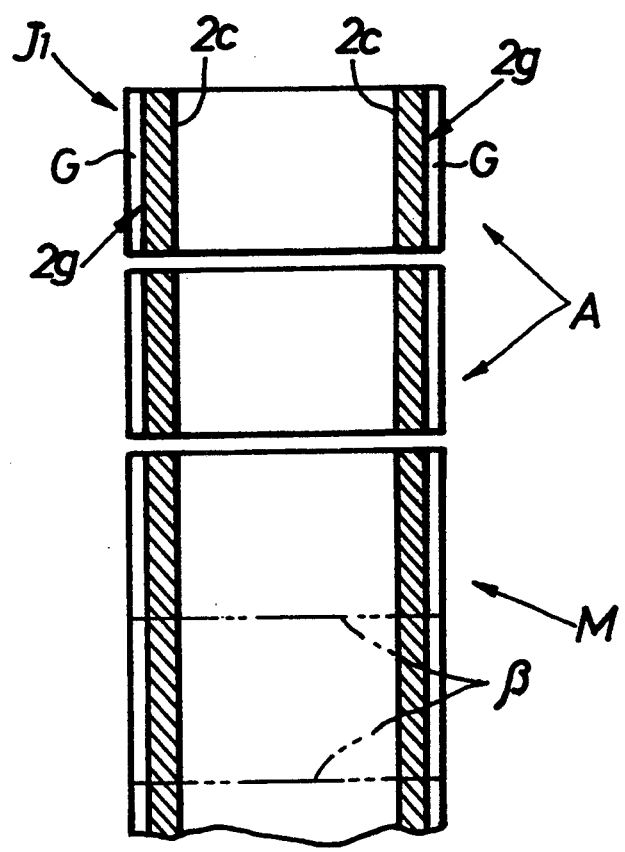
FIG. 6 is a view of explaining a cutting step.

A process for producing the suspension arm A will now be described in connections with FIGS. 5 and 6. The process comprises a first step of forming a base arm material M by an extrusion (see FIG. 5), a second step of cutting the base arm material M into a plurality of suspension arms A (see FIG. 6), and a third step of subjecting a required portion of each of the suspension arms A to a machining.

An extruding apparatus 7 used at a first step comprises a female die 8 having a shaping hole $8a$ for defining the contour of the base material as an extruding material, a male die 9 having a plurality of shaping projections $9a$ adapted to be surrounded by the shaping hole $8a$ to define the profile of an inner surface of the base material M, and a container 10 integrally coupled to both the dies 8 and 9. A billet urging ram 11 is provided within the container 10. The shaping hole $8a$ and the shaping projections $9a$ cooperate with each other to define a die hole D corresponding with the profile of a projected plane parallel to a plane extending through the ribs R of the suspension arm A (i.e., the profile shown in FIG. 1). The die hole D communicates with the inside of the container 10 through a plurality of billet-passing-through-holes $9b$ provided in the male die 9.

A billet 12 of an aluminum simple metal or alloy preheated into a semi-molten state is placed into the container 10, and the ram 11 is operated. In doing so, a portion of the billet 12 is extruded downwardly through the through-holes 9b and the die hole D, thereby providing a based material M extending long in an extruding direction P. The base material M is shown in a sectional view taken along a line 5—5 in FIG. 1.

The base material M, formed in this manner, is then cut along a plurality of planes B, spaced at an equal distance from one another, and substantially perpendicular to the extruding direction P by a cutter (not shown) at the second step, thereby providing a plurality of suspension arms A. Then, mounting portions $J_1$ and $J_2$ of each of the suspension arms A are subjected to a machining to produce mounting holes 2a therein, thus completing the production of the arms A.

Not only the ribs $R_1$, $R_2$ and $R_3$ in the arm body 1, but also the abutments 2c, the guide grooves 2g (thus the cam guides G), the stoppers 2s and the chamfers 2r in the mounting portion $J_1$ or $J_2$, can integrally be formed accurately in the suspension arm A produced in the above manner. Particularly, by extruding the cam guides G, they can be positioned accurately at given locations on the suspension arm A. Therefore, it is possible to properly carry out the adjustment of the position (geometric point) of relative mounting between the bush Bu and the suspension arm A by the cooperation of the eccentric cams $C_1$ and $C_2$ with the cam guides G, i.e., the adjustment of alignment of wheels with a good accuracy.

Figure 7:
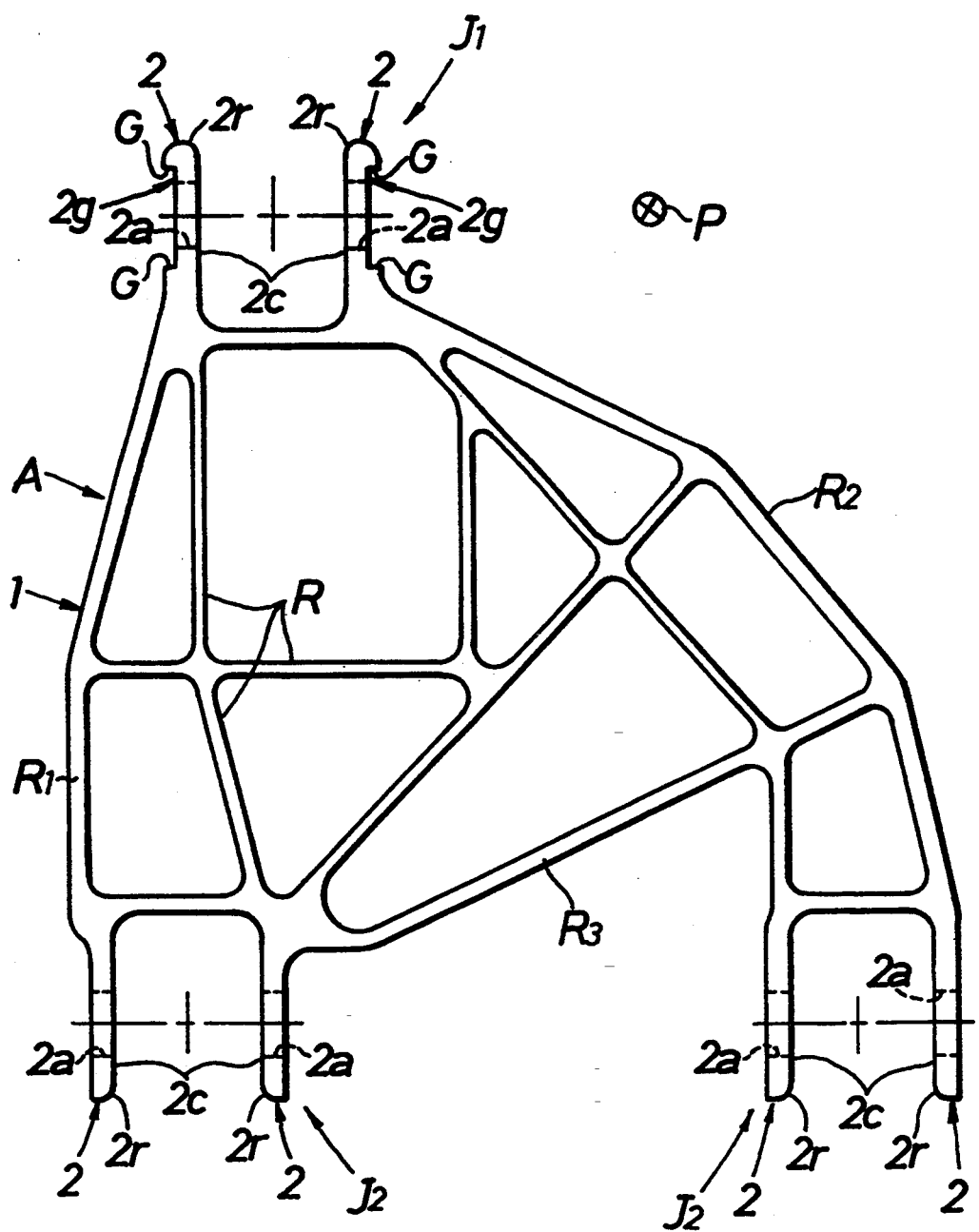
FIG. 7 is a plan view of a second embodiment of a suspension arm produced by the method of the present invention.
Figure 8:
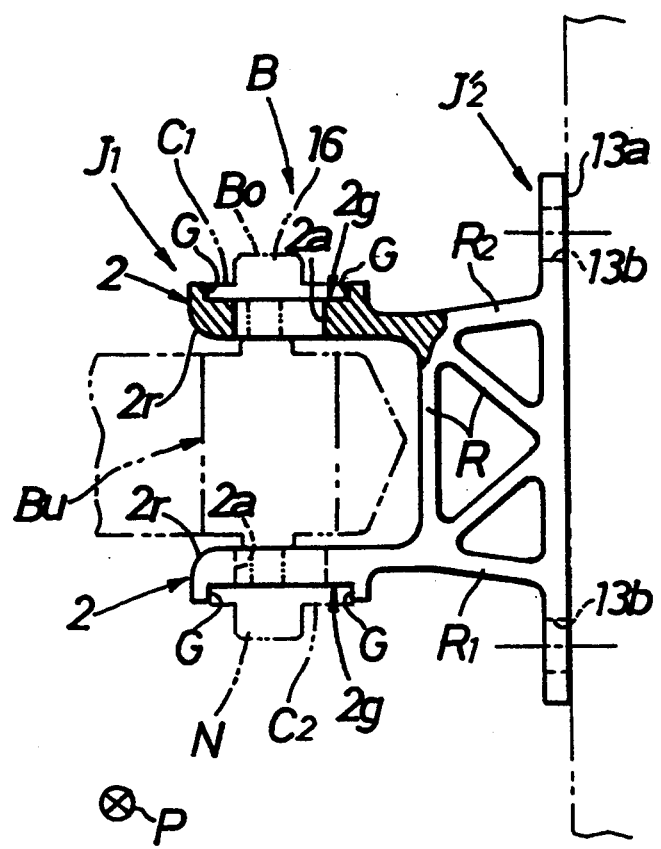
FIG. 8 is a plan view of a third embodiment of a suspension bracket produced by the method of the present invention.
Figure 9:
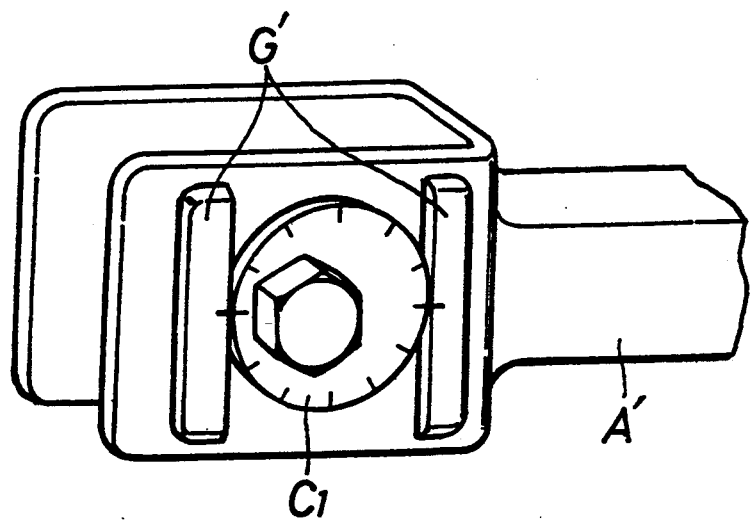
FIGS. 9 and 10 are perspective views of essential portions of suspension members produced by prior art methods, respectively.
Figure 10:
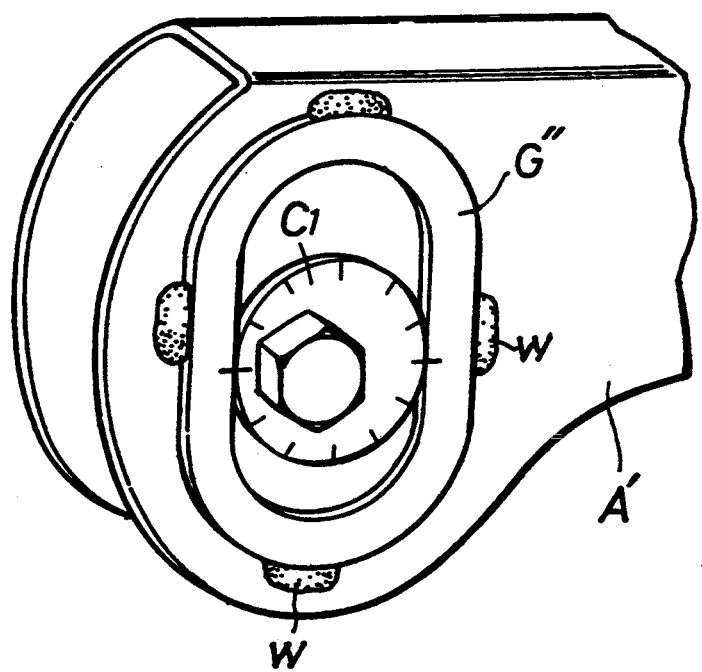

The shape and structure of the suspension member produced by the process of the present invention are not limited to those in the above-described embodiment, and for example, an A-shaped suspension arm as shown in FIG. 7 and a suspension bracket as shown in FIG. 8 can be produced by the process of the present invention.

In the suspension arm shown in FIG. 7, cam guides G are formed particularly on a first one $J_1$ of three mounting portions $J_1$, $J_2$ and $J_2$ to be connected to the other member, by an extrusion in the same manner as described above. The other mounting portions $J_2$ and $J_2$ constitute the second mounting portion according to the present invention, and an arm body 1 integrally connecting these mounting portions $J_2$ and $J_2$ and the first mounting portion $J_1$ to each other is comprised of a basically triangular framework which comprises a plurality of main ribs $R_1$, $R_2$ and $R_3$ and subsidiary ribs R.

The suspension bracket B shown in FIG. 8 comprises a first mounting portion $J_1$ having cam guides G and a second mounting seat $J'_2$ as a second mounting portion coupled directly to the vehicle body. The first mounting portion $J_1$ and the second mounting $J'_2$ are integrally connected to each other through a framework, which comprises a plurality of main ribs $R_1$ and $R_2$ and subsidiary ribs R. The mounting seat $J'_2$ is provided with a seat surface 13a for seating on the vehicle body, and a bolt-insertion hole 13b. Cam guides G, in this suspension bracket B, are also formed by an extrusion in the same manner as described above.

Although each cutting plane B used in cutting the base arm material M to produce the plurality of suspension arms A is a plane perpendicular to the extruding direction P in the illustrated embodiment, it should be understood that at least a portion of each cutting plane B may be a plane oblique to the extruding direction P, or a curved plane.

What is claimed is:

1. A process for producing a plurality of suspension members for a vehicle, each said suspension member comprising a first mounting portion relatively swingably connected to either one of a vehicle body and an axle through a connecting member, and a second mounting portion integrally connected to said first mounting portion and connected to the other of the vehicle body and the axle, said first mounting portion provided at an outer surface thereof with a pair of parallel cam guides for adjusting the relative mounting position between said first mounting portion and said connecting member by cooperation with eccentric cam means connected to said connecting member, said process comprising the steps of extruding a base material for forming said plurality of suspension members and cutting said base material along planes spaced at an equal distance from one another in an extruding direction, said extruding direction being parallel to each said pair of parallel cam guides during the extrusion such that said cam guides of each of said suspension members are formed by said extrusion.

2. A process for producing a plurality of suspension members for a vehicle according to claim 1, further comprising, after said step of extruding, machining mounting holes in at least one of said first and second mounting portions, said mounting holes being formed in a direction transverse to said extruding direction.

* * * * *